United States Patent
> Simons

[15] 3,673,253
[45] June 27, 1972

[54] PROCESS FOR THE PRODUCTION OF AMINOGUANIDINE BICARBONATE

[72] Inventor: Peter Simons, Bergisch Gladbach, Germany

[73] Assignee: Farbenfabriken Bayer Aktiengesellschaft, Leverkusen, Germany

[22] Filed: Feb. 21, 1968

[21] Appl. No.: 707,320

[30] Foreign Application Priority Data

Feb. 24, 1967 Germany..............................F 51627

[52] U.S. Cl.........................................260/564 F
[51] Int. Cl........................................C07c 133/10
[58] Field of Search..............................260/564 F

[56] References Cited

FOREIGN PATENTS OR APPLICATIONS

| | | | |
|---|---|---|---|
| 885,575 | 12/1961 | Great Britain | 260/564 |
| 1,443,108 | 5/1966 | France | 260/564 |
| 51,029 | 11/1966 | Germany | 260/564 |

OTHER PUBLICATIONS

Fantl et al. Ann., 467 pp. 279– 280 (1928)

*Primary Examiner*—Leon Zitver
*Assistant Examiner*—Gerald A. Schwartz
*Attorney*—Burgess, Dinklage & Sprung

[57] ABSTRACT

Production of aminoguanidine bicarbonate by reacting finely divided solid calcium cyanamide with hydrazine, in the form of mono or dihydrazine sulfate or hydrazine hydrate and sulfuric acid in admixture, in neutral to alkaline aqueous medium, e.g. at pH 7 to about 9.5 and about 15°–90° C, using sulfuric acid for pH adjustment to form aminoguanidine, cooling the reaction mixture, e.g. to about 60°–40° C, to precipitate the resultant calcium sulfate sludge, and treating the sludge-free resultant reaction mixture, e.g. at 25°–50° C, with a bicarbonate precipitating agent, e.g. alkali metal or ammonium bicarbonate or carbon dioxide and alkali metal or ammonium hydroxide, to precipitate the aminoguanidine bicarbonate therefrom;

optionally avoiding iron contamination of the desired product by either adjusting to acid pH, e.g. pH 3–4, the reaction mixture prior to bicarbonate agent treatment to maintain such iron in soluble form, e.g. when Fe content low, or adjusting to about pH 7.5–8.5 the reaction mixture prior to bicarbonate agent treatment followed by air introduction, e.g. at 60°–45° C, to remove the iron content, e.g. when Fe content high-up to about 5 percent, as ferric hydroxide precipitate, the latter alternative being optionally carried out prior to calcium sulfate sludge precipitation (i.e. removal) to effect joint precipitation of such ferric hydroxide and sludge prior to bicarbonate treatment.

5 Claims, No Drawings

PROCESS FOR THE PRODUCTION OF AMINOGUANIDINE BICARBONATE

This invention relates to a process for the production of aminoguanidine bicarbonate by reacting calcium cyanamide with hydrazine sulfate or hydrazine and sulfuric acid.

Processes for the production of aminoguanidine bicarbonate may be divided into three groups:
1. Reduction of nitroguanidine or nitrosoguanidine;
2. The hydrazinolysis of nitrosoguanidine or of S-alkylisothiourea;
3. The hydrazination of cyanamide.

The last of these three methods is commercially the most interesting so far as the production of aminoguanidine on a large scale is concerned. The following materials have been described as reaction components for this particular process:
a. cyanamide solution,
b. sodium cyanide and
c. "lime-nitrogen" (= crude calcium cyanamide).

a. Aminoguanidine bicarbonate may be produced by reacting an aqueous solution of cyanamide containing little or no lime with hydrazine or its salts at temperatures of up to about 50° C followed by precipitation in the presence of carbon dioxide which is bubbled through or of carbonates. In cases where the mother liquors formed are used for new batches, the yield may be increased up to 80 percent (German Pat. No. 689,191).

It is possible by increasing the concentration in which the reactants are used to obtain a further increase in yield (German Pat. No. 730,331).

The aqueous cyanamide solution is obtained by extracting calcium cyanamide with water in the cold and neutralizing the resulting aqueous solution with an acid which forms almost insoluble calcium salts. The preparation involves a very careful control and adjustment of the reaction temperatures so as to avoid the initiation of undesired secondary reactions resulting in the formation of dicyandiamide. For the same reason, the cyanamide solution has to be kept weakly acid.

The relatively long times required for the reaction of this cyanamide solution with hydrazine represent a particularly serious disadvantage.

b. High yields are obtained by reacting sodium cyanamide with hydrazine Ann. 467 (1928) 274. Since, however, sodium cyanamide is not available in large quantities and since it is very expensive in comparison with calcium cyanamide, this process cannot be economically worked on an industrial scale.

c. The easiest and most favorable method is the reaction of readily available calcium cyanamide with hydrazine. Unfortunately, the conventional process have never been satisfactorily worked on a large scale mainly because the yields obtained were more or less disencouraging. Thus according to Chem. B 44 (1911) 2713, aminoguanidine nitrate was obtained in a yield of only 58 percent, based on the the hydrazine used, and in a yield of only 47 percent, based on the quantity of nitrogen cyanamide used, by grinding calcium cyanamide and hydrazine sulfate in water, separating the gypsum formed and reacting the resulting product with nitric acid. The process according to German Pat. No. 689,191 in which calcium cyanamide is also used, involves considerable losses in the hydrazine yield due to the reducing impurities present in the calcium cyanamide, in addition to which subsequent crystallization is detrimentally affected and the end product is contaminated by the lime present.

If the reaction of calcium cyanamide with hydrazine is carried out in an acid medium at pH values of from 5 to 6 with a view to avoiding secondary products such as dicyandiamide or melamine, laboratory yields of only 45 to 65 percent are obtained, in which case the fact that the calcium sulfate "sludge" formed is almost impossible to wash out reduced the yield even further in the case of large batches.

The present invention relates to a process for the production of aminoguanidine bicarbonate by means of which it is readily possible directly to obtain high yields of extremely pure end product from hydrazine and calcium cyanamide in a rapid reaction.

A process for the preparation of aminoguanidine bicarbonate has now been found in which calcium cyanamide is reacted with monohydrazine sulfate or dihydrazine sulfate or with hydrazine hydrate and sulfuric acid in aqueous solution, followed by precipitation with readily soluble carbonate or by the introduction of carbon dioxide into the filtrate. The instant process is characterized in that finely divided calcium cyanamide and hydrazine are reacted together by being introduced together into water or by introducing calcium cyanamide into a hydrazine solution, while maintaining a neutral or alkaline medium, accompanied by thorough stirring, the lowest possible cyanamide concentration being maintained throughout the reaction, or at least as long as substantial amounts of hydrazine are present in the reaction mixture, i.e. hydrazine concentrations amounting to more than about 10 to 30 percent of the initial concentration.

Schematically the reaction proceeds according to the following formulas:

$$CaCN_2 + H_2SO_4 \longrightarrow \downarrow CaSO_4 + H_2N-C\equiv N$$

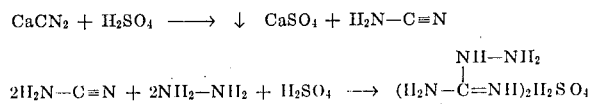

In a preferred embodiment of the new process the calcium cyanamide is added stepwise to the aqueous hydrazine solution at a temperature up to 60° C until about 60–80 percent of the hydrazine used has been reacted. Thereafter the temperature is raised up to 90° C and by the addition of excess calcium cyanamide it is taken care that all the hydrazine is substantially consumed. With similar conditions the process can be performed also continuously, e.g. in cascade connected reactors. Throughout the reaction the pH value of the reaction solution is adjusted to the appropriate value.

In the process according to the invention, therefore, solid finely divided calcium cyanamide is reacted with hydrazine sulfate or hydrazine and sulfuric acid in a neutral or aqueous alkaline medium, accompanied by thorough stirring. For this purpose, the hydrazine component is first of all dissolved in water and the calcium cyanamide is introduced into the resulting aqueous solution, or, alternatively, the calcium cyanamide is introduced simultaneously with the hydrazine component into water in such a way that, while the hydrazine is being added, it is present in the reaction solution in a slight excess relative to the calcium cyanamide. The hydrazine may be used in the form of a hydrate or a dihydrazine sulfate solution or in the form of solid mono or dihydrazine sulfate. The pH value is adjusted by the addition of sulfuric acid. The total amount of calcium cyanamide which can be reacted per liter of water is with advantage such that this amount corresponds up to 120 g and preferably 70 to 80 g of calcium cyanamide.

In this process, the concentration of cyanamide while the calcium cyanamide is being added is low so that the reactions involving cyanamide which would otherwise occur in alkaline medium, resulting in the formation of dicyandiamide, are largely avoided. In addition, the required reaction takes place much more quickly in alkaline medium, resulting in the formation of aminoguanidine. At a pH value of 7 and above, preferably at pH: 7–9.5, this reaction takes place much more quickly, i.e. some five to six times more quickly than the known reaction of hydrazine with a sodium cyanamide solution. Reactions between calcium cyanamide and hydrazine showed that, at a temperature of from 15° to 20° C, the reaction velocity increases an the pH value rises, resulting in the formation of aminoquanidine. On the other hand, the reaction is promoted by increasing the temperature at which it is carried out, although in this case the pH value must be controlled to avoid secondary reaction. For example, it is not advisable to exceed a reaction temperature of 90° C at a pH value of 7, nor is it advisable to exceed a temperature of 40° C at a pH value of 9.5, i.e. the higher the pH value, the lower the reaction temperature must be.

Under the conditions specified, a readily filterable and washable calcium sulfate sludge is obtained, the aminoguanidine yields amounting to more than 84 percent, based on the calcium cyanamide and hydrazine. If on the other hand this reaction were to be carried out in an acid medium, the basically already poor yield would be reduced even further by a deposit of calcium sulfate which is much more difficult to filter and wash out as the throughput increases.

Since, however, the hydrazine component is the most expensive of the starting materials, a further increase in yield, based on the amount of hydrazine used, would be more economical, even at the expense of a reduction in yield, based on the amount of calcium cyanamide used. This can be achieved by using an excess of calcium cyanamide of up to 20 percent, giving an aminoguanidine/hydrazine yield of more than 90 percent and an aminoguanidine/calcium cyanamide yield of more than 80 percent. However, in cases where an excess of calcium cyanamide is used, precautions must be taken to ensure that the temperature does not exceed 50° C during the addition because otherwise secondary products will be formed from the excess cyanamide, detrimentally affecting the filterability of the reaction products. A further increase in the amount of calcium cyanamide used does not provide any appreciable improvement in the yields.

After the calcium sulfate sludge has been filtered off and washed out, the filtrate together with the water used for washing is adjusted to a pH value of from 4 to 6, and the aminoguanidine bicarbonate is precipitated from the solution with an equivalent quantity of a soluble bicarbonate, preferably at a temperature in the range of from 25° to 50° C. Ammonium bicarbonate and the ammonium sulfate formed therefrom during precipitation are both more suitable by virtue of their high solubility for the production of a high-purity aminoguanidine bicarbonate than alkali metal bicarbonates, although these also give an extremely pure product. Instead of being carried out with these salts, precipitation may also be effected by introducing carbon dioxide into the solution adjusted to a pH value of from 7 to 8, e.g. by adding alkali metal or ammonium hydroxide therewith. The preferred alkali metals are Na, K and Li.

The procedure adopted in accordance with the invention must be followed not only to ensure that the calcium sulfate sludge is obtained in a high yield and in a readily filterable form, but also to ensure that the aminoguanidine bicarbonate which is precipitated may readily be filtered.

Iron is present to a greater or lesser extent in crude calcium cyanamide, emanating both from its production and from grinding in iron mills. Most of the iron remains in solution in bivalent form when the calcium cyanamide is reacted with hydrazine, being precipitated to a greater or lesser extent as ferric hydroxide during and after filtering due to the influence of air. Accordingly, the aminoguanidine bicarbonate prepared therefrom is also yellow in color to a greater or lesser extent. Unfortunately, this is undesirable so far as further processing is concerned, for example into triazoles, azo dyes, sensitizers and so on, because a pure white product is needed in cases such as these.

Regarding a further development of the process according to the invention, the precipitation of ferric hydroxide can be prevented, given a low iron content, by adjusting the filtrate to a pH value of from 3 to 4 with sulfuric acid before it is precipitated and only precipitating the aminoguanidine with alkaline bicarbonate after the filtrate has turned completely clear, the iron remaining in solution in the form of iron bicarbonate. Since, however, the amount of iron present in calcium cyanamide can fluctuate within wide limits and since this further development can only be applied in cases where the iron content is negligible, the invention has the advantage of providing a universal method which always gives a pure white and substantially iron-free aminoguanidine bicarbonate, irrespective of the amount of iron present in the calcium cyanamide, i.e. even if it is high, e.g. up to 2 or even 5 percent of the calcium cyanamide used.

Surprisingly, it has been found that, on completion of the reaction involving calcium cyanamide, hydrazine and sulfuric acid in an alkaline medium at specific temperatures and pH values, the iron can be precipitated in the form of ferric hydroxide by the introduction of air without any effect on, or discolouration of, the aminoguanidine. According to the literature, aminoguanidine is unstable in an alkaline medium, and can be oxidized in the presence of air. Our own investigations have shown, however, that aminoguanidine is unaffected by air at a temperature of 60° C and at a pH value of 7.5, or at a temperature of from 45° to 50° C even at a pH value as high as 8.5, and that, under these conditions, all the iron is precipitated as ferric hydroxide.

Thus, following the separation of the calcium sulfate deposit formed during the reaction of the calcium cyanamide with the hydrazine and sulfuric acid, the filtrate together with the water used for washing may be adjusted to a pH value of from 8.0 to 8.5 at 45°–50° C, then all the iron precipitated in trivalent form as the hydroxide by the introduction of air may be filtered off and the aminoguanidine bicarbonate may be subsequently precipitated in pure form.

Since, with this method, the iron hydroxide is precipitated in ultra-fine, almost colloidal form and so is difficult to filter off, it is of greater advantage directly to introduce air into the reaction mixture under the conditions specified before the calcium sulfate is filtered off. After the starting materials have been reacted to form aminoguanidine, the reaction mixture has a temperature of from 70° to 90° C. and a pH value of approximately 7.0. During the subsequent cooling stage, the supply of sulfuric acid which regulates the pH value is stopped at 60° C and air is introduced as cooling progresses. After a brief interval, the iron is precipitated almost quantitatively as readily filterable ferric hydroxide.

The subsequent filtration and washing out of the calcium sulfate deposit containing ferric hydroxide do not involve any difficulties because filtration is no longer accompanied by the precipitation of iron hydroxide which would narrow the filter area. As already described, the aminoguanidine bicarbonate is precipitated from the filtrate.

Thus, the aminoguanidine bicarbonate is obtained not only in pure white, iron-free form, but also in a better yield of around 95 percent, i.e. based on the hydrazine.

Under the conditions specified, the elimination of iron from an aminoguanidine solution is generally applicable, i.e. even in the production of aminoguanidine by another process.

Example 1

5 kg of monohydrazine sulfate and 5 kg of finely ground calcium cyanamide containing 21.5 % N were simultaneously and uniformly added with vigorous stirring to 18 liters of water at a pH value of 9.5. The pH value was regulated by the addition of 50 percent sulfuric acid in an appropriate quantity. The reaction temperature was kept at 40° C. After the reaction mixture had been stirred for 30 minutes at pH 9, the pH value was adjusted to 7 and the mixture was heated for about 1 hour at 80° C at that pH value. After the reaction mixture had been cooled to 60° C, it was filtered and the filtration residue, consisting essentially of calcium sulfate, was washed out 7 times with warm water. Both the filtrate and the water used for washing were collected in a precipitation vessel and were adjusted to a pH value of 6.5 with 50 percent sulfuric acid. 3.30 kg of sodium bicarbonate were then slowly and uniformly added at 30° C as a result of which the aminoguanidine bicarbonate was precipitated. After the precipitation liquid had been cooled to 20° c, the aminoguanidine bicarbonate was separated off in a centrifuge. 5.4 kg of moist aminoguanidine bicarbonate were obtained 81.03 percent of this corresponds to 4.40 kg of 100 percent product and to a yield of 84.2 percent. The product was light brown in color due to the presence of iron (III).

Example 2

5 kg of finely ground calcium cyanamide containing 21.5 percent N and 4.9 liters of a 50 percent dihydrazine sulfate solution (=3.12 kg dihydrazine sulfate) were simultaneously and uniformly added with vigorous stirring to 15 liters of water at a pH value of 8. In this case, too, the pH value was adjusted with 50 percent sulfuric acid. The reaction temperature was 45° C. On completion of the addition, the reaction mixture was stirred for 30 minutes at the pH value indicated, then adjusted to pH 7 and subsequently heated to 70° C at that pH value. The reaction mixture was then cooled to 60° C and then filtered and washed as described in Example 1. Both the filtrate and the water used for washing were adjusted to pH 4 with sulfuric acid and stirred until the originally hazy solution had completely cleared.

The aminoguanidine bicarbonate was then precipitated with 3.3 kg of sodium bicarbonate and separated in a centrifuge. 5.45 kg of a moist white product containing 81.4 percent of aminoguanidine bicarbonate were obtained. This corresponds to 4.40 kg of a 100 percent and a yield of 84.7 percent.

Example 3

The procedure was as described in Example 2 except that 5.60 kg of calcium cyanamide (containing 21.5 percent N), corresponding to an excess of 12 percent, were used and the times allowed for the addition of calcium cyanamide and dihydrazine sulfate solution was very considerably shortened. After reaction, filtration and washing, air was passed through the hazy total filtrate solution which had a pH value of 7.9, over a period of 15 minutes. A brownish-red deposit of $Fe(OH)_3$ was precipitated and filtered off. On precipitation with 3.30 kg of $NaHCO_3$, the clear filtrate gave a pure white end product which again was separated off in a centrifuge. 5.5 kg of moist 85.9 percent aminoguanidine bicarbonate were obtained. This corresponds to 4.70 kg of a 100 percent product and to a yield, based on the amount of hydrazin used, of 90.5 percent.

Example 4

15 liters of water and 4.87 liters of 50 percent dihydrazine sulfate solution were introduced into the reaction vessel. 5.60 kg of calcium cyanamide containing 23.6 percent N (= 15 percent excess) were then added with vigorous stirring, the pH value being kept at 8.0 by the addition of 50 percent sulfuric acid. After heating to 80° C at a pH value of 7.2 the reaction solution was cooled. After a temperature of 60° C had been reached, the supply of sulfuric acid was stopped and air was bubbled through for some 15 minutes as cooling progressed to 45° C. The pH value meanwhile rose from 7.2 to 8.1. Subsequent filtration and washing gave a clear iron-free filtrate which, when precipitated with 3.3 kg of $NaHCO_3$, gave a pure white product. 5.7 kg of moist 88.2 percent aminoguanidine bicarbonate (the rest was water) were obtained by separation in a centrifuge. This corresponds to a yield of 95.2 percent, based on the amount of hydrazine used.

The calcium cyanamide used in this case has a particularly high iron content (1.2 percent Fe) and gave a reddish-brown product with the method used in Example 1, and a light brown product with the method used in Example 2.

What is claimed is:

1. In the production of aminoguanidine bicarbonate by reacting finely divided calcium cyanamide with a hydrazine component selected from the group consisting of monohydrazine sulfate, dihydrazine sulfate and hydrazine hydrate plus sulfuric acid in aqueous medium thereby obtaining aminoguanidine in dissolved form and precipitated calcium sulfate, removing the calcium sulfate followed by precipitating and removing the aminoguanidine in the form of the substantially pure bicarbonate salt, the improvement which comprises carrying out the reaction between the finely divided calcium cyanamide and the hydrazine at a pH value of from about 7 to 9.5 and at a temperature in the range of from about 15° to 90° C, upon removal of said calcium sulfate adjusting the resulting reaction mixture to a pH of about 7.5–8.5, introducing air thereinto at a temperature between 60°–45° C, to cause precipitation of any iron present in the form of ferric hydroxide substantially without affecting the aminoguanidine present, the resultant ferric hydroxide being separated from the reaction mixture, and thereafter precipitating the aminoguanidine in the form of the aminoguanidine bicarbonate salt.

2. Process according to claim 1 wherein the pH of the reaction mixture is adjusted by the addition of sulfuric acid 3. Process according to claim 1 wherein the calcium cyanamide is used in a quantity such that about 30 to 120 g of cyanamide nitrogen are present per liter of water present in said aqueous medium, the calcium cyanamide being used in up to 20 percent excess based on the hydrazine component.

4. Process according to claim 2 wherein the reaction is carried out at a temperature up to 60° C until about 60 to 80 percent of the hydrazine used are consumed whereby in the reaction medium the lowest possible cyanamide concentration is maintained and thereafter continuing the reaction at a temperature up to 90° C, the final cyanamide concentration being in excess over the stoichiometric amount necessary to convert the hydrazine into aminoguanidine.

5. In the production of aminoguanidine bicarbonate by reacting finely divided calcium cyanamide with a hydrazine component selected from the group consisting of monohydrazine sulfate, dihydrazine sulfate and hydrazine hydrate plus sulfuric acid in aqueous medium thereby obtaining aminoguanidine in dissolved form and precipitated calcium sulfate, removing the calcium sulfate followed by precipitating and removing the aminoguanidine in the form of the substantially pure bicarbonate salt, the improvement which comprises cooling the resultant reaction mixture to about 60°–40° C prior to removal of the calcium sulfate and adjusting the pH to about 7.5–8.5, introducing air thereinto to cause joint precipitation separation of the resultant calcium sulfate sludge and the attendant iron present as ferric hydroxide substantially without affecting the aminoguanidine present, and thereafter precipitating the aminoguanidine in the form of the aminoguanidine bicarbonate salt.

* * * * *